United States Patent
Li

(10) Patent No.: US 11,556,128 B2
(45) Date of Patent: Jan. 17, 2023

(54) METHOD, ELECTRONIC DEVICE AND STORAGE MEDIUM FOR TESTING AUTONOMOUS DRIVING SYSTEM

(71) Applicant: BEIJING BAIDU NETCOM SCIENCE AND TECHNOLOGY CO., LTD., Beijing (CN)

(72) Inventor: Qingyu Li, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 253 days.

(21) Appl. No.: 17/024,505

(22) Filed: Sep. 17, 2020

(65) Prior Publication Data
US 2021/0208586 A1    Jul. 8, 2021

(30) Foreign Application Priority Data
Jan. 2, 2020    (CN) .......................... 202010002080.X

(51) Int. Cl.
*G05D 1/00* (2006.01)
*B60W 30/09* (2012.01)
(Continued)

(52) U.S. Cl.
CPC ........... *G05D 1/0088* (2013.01); *B60W 30/09* (2013.01); *B60W 50/14* (2013.01); *G05D 1/0214* (2013.01);
(Continued)

(58) Field of Classification Search
CPC ............... G05D 1/0088; G05D 1/0214; G05D 2201/0213; B60W 30/09; B60W 50/14;
(Continued)

(56) References Cited

U.S. PATENT DOCUMENTS

| | | | |
|---|---|---|---|
| 10,831,207 B1 * | 11/2020 | Leung | G05D 1/0088 |
| 2018/0139585 A1 | 5/2018 | Gholmieh et al. | |
| 2019/0146492 A1 * | 5/2019 | Phillips | G05D 1/0088 |
| | | | 701/23 |

FOREIGN PATENT DOCUMENTS

| | | | |
|---|---|---|---|
| CN | 105954040 A | 9/2016 | |
| CN | 108332977 A | 7/2018 | |

(Continued)

OTHER PUBLICATIONS

First Office Action and Search Report from CN app. No. 202010002080.X, dated Apr. 22, 2021, with English translation from Global Dossier.

(Continued)

*Primary Examiner* — Marthe Y Marc-Coleman
(74) *Attorney, Agent, or Firm* — Ladas & Parry, LLP

(57) ABSTRACT

A method, an electronic device and a computer-readable storage medium for testing an autonomous driving system which relate to the technical field of autonomous driving are proposed. An embodiment for testing the autonomous driving system includes: obtaining scenario description information of a testing scenario; analyzing the scenario description information, and determining a scenario risk, a scenario probability and a scenario complexity corresponding to the testing scenario; obtaining a scenario weight of the testing scenario according to the scenario risk, scenario probability and scenario complexity; determining a test period corresponding to the scenario weight, where the test period is used for the autonomous driving system being tested in the testing scenario. The technical solution may reduce the testing pressure of the autonomous driving system and improve the testing efficiency of the autonomous driving system.

15 Claims, 2 Drawing Sheets

(51) Int. Cl.
*B60W 50/14* (2020.01)
*G05D 1/02* (2020.01)
*G08G 1/16* (2006.01)

(52) U.S. Cl.
CPC ..... *G08G 1/166* (2013.01); *G05D 2201/0213* (2013.01)

(58) Field of Classification Search
CPC ............. B60W 60/0011; B60W 50/04; B60W 2050/0005; B60W 2050/0022; B60W 2050/041; G08G 1/66; G06F 11/3684; G06F 11/3672; G01M 17/007; G05B 23/0254
See application file for complete search history.

(56) References Cited

FOREIGN PATENT DOCUMENTS

| | | |
|---|---|---|
| CN | 109395385 A | 3/2019 |
| CN | 109520744 A | 3/2019 |
| CN | 110188797 A | 8/2019 |
| CN | 110579216 A | 12/2019 |
| CN | 110579359 A | 12/2019 |
| CN | 110597711 A | 12/2019 |
| JP | 2019-043157 A | 3/2019 |
| JP | 2019-185783 A | 10/2019 |
| JP | 2019-202778 A | 11/2019 |
| WO | 2017210222 A1 | 12/2017 |
| WO | 2018068427 A1 | 4/2018 |

OTHER PUBLICATIONS

Extended European Search Report from EP app. No. 20217803.4, dated May 28, 2021.
Peng et al., "Design of Autopilot Dynamic Test System", Computer Measurement and Control, Dec. 31, 2019. pp. 84-88.
Gan et al., Progress in Virtual Test and Evaluation of Autonomous Vehicle, Hydrogen Fuel Cell Album, Dec. 31, 2019. pp. 48-50.
Notice of Allowance for Chinese Patent Application CN202010002080.X issued by the Chinese Patent Office dated Nov. 24, 2021, and its English Translation.
Communication pursuant to Art. 94(3) EPC for EP20217803.4 issued by EPO dated Feb. 9, 2022.
Lachmann Remo et al: "System-Level Test Case Prioritization Using Machine Learning", 2016 15th IEEE International Conference on Machine Learning and Applications (ICMLA), IEEE, Dec. 18, 2016 (Dec. 18, 2016), pp. 361-368, XP033055548, DOI: 10.1109/ICMLA.2016.0065.
Communication under Rule 71(3) from European Patent Application No. 20217803.4 dated Jul. 19, 2022.
Office action from Korean Patent Application No. 10-2020-0189191 dated Jul. 13, 2022, and its English translation from Global Dossier.
Office action from Japanese Patent Application No. 2021-000182 dated Nov. 7, 2022, and its English translation from Global Dossier.

* cited by examiner

METHOD, ELECTRONIC DEVICE AND STORAGE MEDIUM FOR TESTING AUTONOMOUS DRIVING SYSTEM

RELATED APPLICATIONS

The present application claims the priority and benefit of Chinese Patent Application No. 202010002080.X, filed on Jan. 2, 2020. The disclosure of the above application is incorporated herein by reference in its entirety.

TECHNICAL FIELD

The present disclosure relates to the testing technical field, particularly to a method, an electronic device and a computer-readable storage medium for testing an autonomous driving system in the technical field of autonomous driving.

BACKGROUND

Vehicle performance test is very important for enhancing vehicle safety.

SUMMARY

A technical solution employed by the present disclosure to solve the technical problem is to provide a method, an apparatus, an electronic device and a computer-readable storage medium for testing an autonomous driving system. According to an embodiment, the method includes: obtaining scenario description information of a testing scenario; analyzing the scenario description information, and determining a scenario risk, a scenario probability and a scenario complexity corresponding to the testing scenario; obtaining a scenario weight of the testing scenario according to the scenario risk, the scenario probability and the scenario complexity; and determining a test period corresponding to the scenario weight, where the test period is used for the autonomous driving system being tested in the testing scenario. The technical solution of the present disclosure may reduce the testing pressure of the autonomous driving system and improve the testing efficiency of the autonomous driving system.

According to an embodiment of the present disclosure, the scenario complexity includes an environment complexity and a mission complexity corresponding to the testing scenario. The step may define the scenario complexity closer to actuality in conjunction with more elements.

According to an embodiment of the present disclosure, obtaining the scenario weight of the testing scenario according to the scenario risk, the scenario probability and the scenario complexity includes: determining a risk level according to the scenario risk, determining a probability level according to the scenario probability, and determining a complexity level according to the scenario complexity; obtaining the scenario weight of the testing scenario, according to a summing result of weight values corresponding respectively to the risk level, the probability level and the complexity level. The step may enhance the accuracy of the obtained scenario weight.

According to an embodiment of the present disclosure, determining the complexity level according to the scenario complexity includes: obtaining a standard complexity corresponding to a standard scenario; comparing the scenario complexity with the standard complexity to determine differed attributes, and obtaining level up values corresponding respectively to differed attributes; and determining the complexity level according to a summing result between the obtained level up values and an initial level. This step may give full thoughts to various attributes included in the scenario complexity and improve the accuracy of the determined complexity level.

According to an embodiment of the present disclosure, the method further includes: obtaining problems occurring in the autonomous driving system being tested in the testing scenario; determining a degree of importance of the problems occurring in the autonomous driving system, according to the scenario weights corresponding to the testing scenarios. This step may define the degree of importance of the problems according to the scenario weights corresponding to the testing scenarios.

According to an embodiment of the present disclosure, the method further includes: obtaining, respectively, driving scores for the autonomous driving system being tested in a plurality of testing scenarios; performing weighted averaging for the driving scores according to the scenario weights corresponding respectively to the plurality of testing scenarios, and taking a calculation result as a final score of the autonomous driving system. This step may more accurately evaluate the driving capability of the autonomous driving system according to the scenario weights corresponding to the testing scenarios.

A technical solution employed by the present disclosure to solve the technical problem is to provide an apparatus for testing an autonomous driving system. According to an embodiment, the apparatus includes: an obtaining unit configured to obtain scenario description information of a testing scenario; a determining unit configured to analyze the scenario description information, and determine a scenario risk, a scenario probability and a scenario complexity corresponding to the testing scenario; a processing unit configured to obtain a scenario weight of the testing scenario according to the scenario risk, the scenario probability and the scenario complexity; and a testing unit configured to determine a test period corresponding to the scenario weight, the test period being used for the autonomous driving system being tested in the testing scenario.

According to an embodiment of the present disclosure, the scenario complexity determined by the determining unit includes an environment complexity and a mission complexity corresponding to the testing scenario.

According to an embodiment of the present disclosure, upon obtaining the scenario weight of the testing scenario according to the scenario risk, the scenario probability and the scenario complexity, the processing unit specifically performs: determining a risk level according to the scenario risk, determining a probability level according to the scenario probability, and determining a complexity level according to the scenario complexity; obtaining the scenario weight of the testing scenario, according to a summing result of weight values corresponding respectively to the risk level, the probability level and the complexity level.

According to an embodiment of the present disclosure, upon determining the complexity level according to the scenario complexity, the processing unit specifically performs: obtaining a standard complexity corresponding to a standard scenario; comparing the scenario complexity with the standard complexity to determine differed attributes, and obtaining level up values corresponding respectively to differed attributes; and determining the complexity level according to a summing result between the obtained level up values and an initial level.

According to an embodiment of the present disclosure, the testing unit further performs: obtaining problems occurring in the autonomous driving system being tested in the testing scenario; and determining a degree of importance of the problems occurring in the autonomous driving system according to the scenario weights corresponding to the testing scenarios.

According to an embodiment of the present disclosure, the testing unit further performs: obtaining, respectively, driving scores for the autonomous driving system being tested in a plurality of testing scenarios; and performing weighted averaging for the driving scores according to the scenario weights corresponding respectively to the plurality of testing scenarios, and taking a calculation result as a final score of the autonomous driving system.

An embodiment of the present disclosure has the following advantages or beneficial effects: the technical solution may reduce the testing pressure of the autonomous driving system and improve the testing efficiency of the autonomous driving system. Since the scenario weights are obtained by analyzing the scenario risk, the scenario probability and the scenario complexity of the testing scenarios, and the test periods corresponding to the testing scenarios are determined according to the scenario weights, the technical solutions according to the present disclosure may solve the technical problem in the existing art that test should be performed for tens of thousands of scenarios since it is unable to distinguish testing scenarios with different degrees of importance, thereby achieving the technical effect of reducing the testing pressure of the autonomous driving system and improving the testing efficiency of the autonomous driving system.

Other effects of the above optional modes will be described hereunder in conjunction with embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure will be described below with reference to the accompanying drawings, include various details of the embodiments of the present disclosure to facilitate understanding, and should be considered as merely exemplary. Therefore, those having ordinary skill in the art should recognize that various changes and modifications may be made to the embodiments described herein without departing from the scope and spirit of the application. Also, for the sake of clarity and conciseness, depictions of well-known functions and structures are omitted in the following description.

For an autonomous driving vehicle, it is necessary to test the autonomous driving vehicle by setting different testing scenarios, so as to ensure the safety of the autonomous driving vehicle. There are tens of thousands of scenarios for testing autonomous driving. Since the degrees of importance of different testing scenarios are not distinguished, test should be performed for tens of thousands of scenarios each time, which causes a huge testing pressure on the one hand, and reduces the testing efficiency on the other hand.

Figure 1:
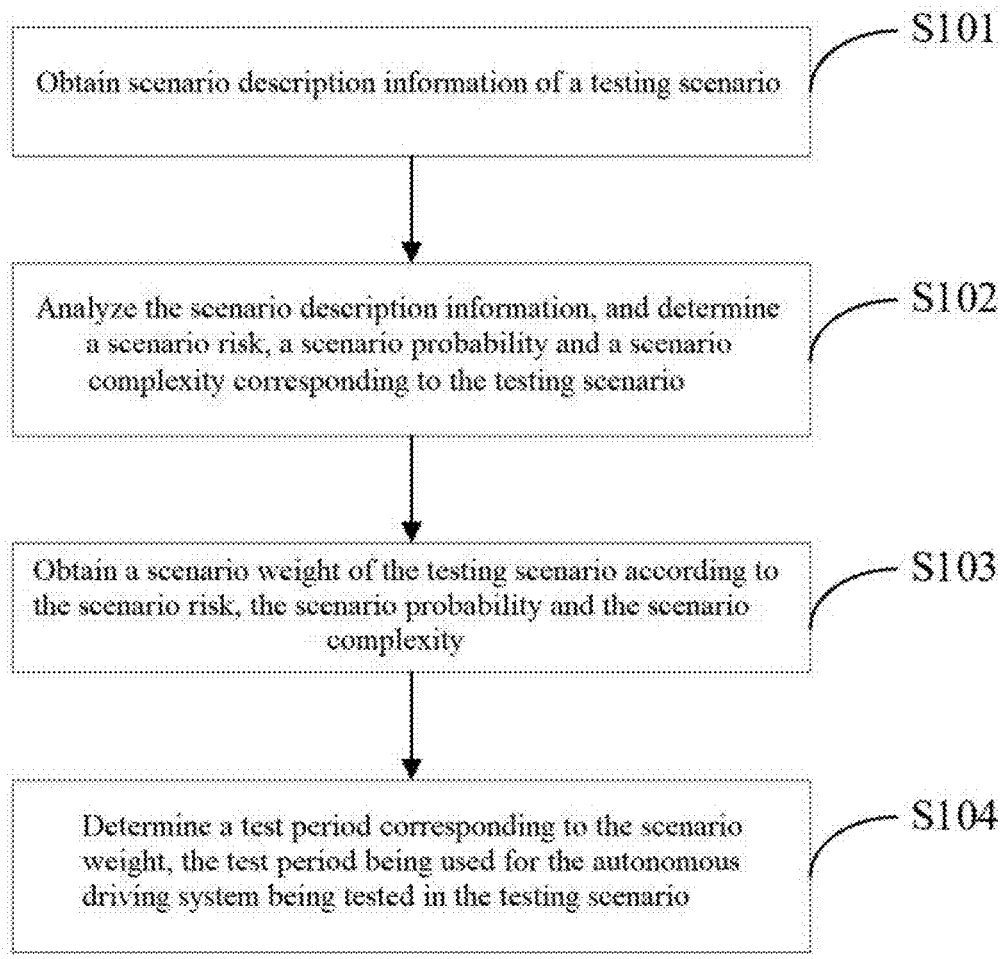
FIG. 1 illustrates a flow chart of a method for testing an autonomous driving system according to an embodiment of the present disclosure.

FIG. 1 illustrates a flow chart of a method for testing an autonomous driving system according to an embodiment of the present disclosure. With reference to FIG. 1, the method includes:

At S101, scenario description information of a testing scenario is obtained.

At this step, the scenario description information of the testing scenario is obtained. For example, the testing scenario in this step may be a combination of a driving occasion and a driving situation for testing the driving performance of the autonomous driving system. For example, the obtained scenario description information may include information describing external states such as roads, traffic facilities, weather conditions and traffic participants corresponding to the testing scenario, and a driving mission (or task) and state of the autonomous driving system.

For example, the obtained scenario description information of the testing scenario in this step may include "cross a pedestrian crossing on a road in the snowy daytime", or include "wait for a green traffic light at a crossroad on a fine (sunny) day", or include "drive on an unobstructed road segment at night".

It may be appreciated that the autonomous driving system in the present disclosure may be a system enabling autonomous driving, and may be an actual automatically-driven vehicle or a virtual autonomous driving software.

At S102, the scenario description information is analyzed, and a scenario risk, a scenario probability and a scenario complexity corresponding to the testing scenario are determined.

At this step, the scenario description information obtained at Step S101 is analyzed, and a scenario risk, a scenario probability and a scenario complexity corresponding to the testing scenario are determined.

Specifically, the scenario risk corresponding to the testing scenario in this step is used to represent the autonomous driving system has no collision risk in the testing scenario, or has a collision risk including a vehicle collision risk and a pedestrian collision risk. The vehicle collision risk may include a collision between vehicles and a collision between a vehicle and a traffic facility. The pedestrian collision risk may include a collision between a vehicle and a pedestrian, a collision between a vehicle and a rider (a bicyclist or a motorcyclist), and a collision between a vehicle and a motorcycle.

The scenario probability corresponding to the testing scenario determined in this step is used to represent a frequency of occurrence of the testing scenario in actual driving, and may include a low probability (occurs a few times or less a year), a medium probability (occurs once a month or more often averagely) and a high probability (occurs during almost every drive averagely).

The scenario complexity corresponding to the testing scenario determined in this step includes an environment complexity and a mission complexity corresponding to the testing scenario. The environment complexity represents an environment attribute corresponding to the testing scenario, and includes a road type (e.g., a straight road, a crossroad, a slope, a tunnel, a mountain path etc.) where the testing scenario lies, a number of obstacles (e.g., the number of obstacles is greater than 3, or less than or equal to 3), weather conditions (e.g., fine, rain, snow and fog), light conditions (e.g., daylight, dark/night, and dark/night but lighted), road surface conditions (e.g., good, wet, snowy, and icy), humidity conditions (e.g., high, normal, and low), temperature conditions (e.g., high, normal, and low) and atmospheric pressure conditions (e.g., high, normal, and low); the mission complexity represents a mission category of the mission (or task) performed by the autonomous driving system in the testing scenario, and the mission category for example includes "longitudinal control" and "longitudinal control and lateral control".

For example, if the obtained scenario description information is "wait for a green traffic light at a crossroad on a fine/sunny day", the scenario risk corresponding to the testing scenario determined in this step is "pedestrian collision risk", the scenario probability is "a high probability", and the scenario complexity is "crossroad, the number of obstacles greater than 3, fine(sunny), daylight(daytime), longitudinal control".

In addition, in this step, when the scenario description information is analyzed, the scenario risk, the scenario probability and the scenario complexity included in the scenario description information may be obtained by a conventional natural language understanding, or may be obtained by a pre-trained machine learning model, i.e., the scenario description information is input into the machine learning model, and the scenario risk, the scenario probability and the scenario complexity corresponding to the testing scenario are obtained according to an output result of the machine learning model.

At S103, a scenario weight of the testing scenario is obtained according to the scenario risk, scenario probability and scenario complexity.

In this step, a scenario weight of the testing scenario is obtained according to the scenario risk, the scenario probability and the scenario complexity obtained at step S102.

Specifically, the following manner may be employed when the scenario weight of the testing scenario is obtained according to the scenario risk, the scenario probability and the scenario complexity at this step: determining a risk level according to the scenario risk, determining a probability level according to the scenario probability, and determining a complexity level according to the scenario complexity; and obtaining the scenario weight of the testing scenario, according to a summing result of weight values corresponding to the determined risk level, the probability level and the complexity level.

At this step, the summing result of weight values corresponding to the three levels may be directly taken as the scenario weight of the testing scenario; it is also possible that after the summing result of weight values corresponding to the three levels is obtained, a numerical value corresponding to a scope where the summing result lies is taken as the scenario weight of the testing scenario.

For example, if the weight value corresponding to the risk level of a certain testing scenario is "2", the weight value corresponding to the probability level is "3" and the weight value corresponding to the complexity level is "2", the summing result "7" of the weight values may be directly taken as the scenario weight of the testing scenario at this step. For another example, if the summing result "3–4" of the weight values corresponding to a value "1", the summing result "5–6" corresponds to a value "2", the summing result "7–8" corresponds to a value "3" and the summing result "9" corresponds to a value "4", "3" may be determined as the scenario weight of the testing scenario at this step.

At this step, when the risk level is determined according to the scenario risk, a level corresponding to the determined scenario risk may be taken as the risk level according to a preset correspondence relationship between the risk and the level. In the preset correspondence relationship between the risk and the level, "no collision risk" corresponds to the level "R1", "vehicle collision risk" corresponds to level "R2", and "pedestrian collision risk" corresponds to level "R3".

At this step, when the probability level is determined according to the scenario probability, a level corresponding to the determined scenario probability may be taken as the probability level according to a preset correspondence relationship between the probability and the level. In the preset correspondence relationship between the probability and the level, "a low probability" corresponds to level "P1", "a medium probability" corresponds to level "P2", and "a high probability" corresponds to level "P3".

The scenario complexity includes many attributes. Hence, to enhance the accuracy of the obtained complexity level, the following manner may be employed upon determining the complexity level according to the scenario complexity at this step: obtaining a standard complexity corresponding to a standard scenario, the standard complexity including a standard environment attribute and a standard mission attribute, the standard environment attribute being "a straight road, the number of obstacles less than or equal to 3, fine(or sunny), daylight, good road surface conditions", and the standard mission attribute being "longitudinal control"; comparing the scenario complexity with the standard complexity to determine differed attributes, and obtaining level up values corresponding respectively to the differed attributes; determining the complexity level according to a summing result between the obtained level up values and an initial level. The initial level corresponds to the standard scenario, and the initial level is 0.

It may be appreciated that at this step, the level up values corresponding to the differed attributes are preset, where the level up value when the attribute "road type" differs/changes is "1", the level up value when the attribute "the number of obstacles" differs/changes is "1", the level up level when the attribute "weather conditions" differs/changes is "2", the level up value when the attribute "light conditions" differs/changes is "2", the level up value when the attribute "road surface conditions" differs/changes is "2", and the level up value when the mission attribute differs/changes is "1", It may be appreciated that when the complexity level is determined according to the summing result between the level up value and the initial level, the level corresponding to the summing result may be taken as the complexity level. For example, the summing result "0–1" may correspond to level "C1", the summing result "2–3" may correspond to level "C2", and the summing result "4–5" may correspond to level "C3".

For example, if the comparison between the scenario complexity and the standard complexity shows that the attributes "the number of obstacles", "weather conditions" and "road surface conditions" change, the summing result of the obtained level up value and the initial level at this step is "5", and therefore the complexity level corresponding to the scenario complexity is "C3".

When the weight values corresponding to the levels are obtained at this step, the weight values corresponding to the risk level, the probability level and the complexity level are obtained respectively according to the preset correspondence relationship between the levels and weight values.

At this step, the preset correspondence relationship between the levels and weight values may be: the weight value corresponding to the risk level "R1" is "1", the weight value corresponding to the risk level "R2" is "2", and the weight value corresponding to the risk level "R3" is "3"; the weight value corresponding to the probability level "P1" is "1", the weight value corresponding to the probability level "P2" is "2", and the weight value corresponding to the probability level "P3" is "3"; and the weight value corresponding to the complexity level "C1" is "1", the weight value corresponding to the complexity level "C2" is "2", and the weight value corresponding to the complexity level "C3" is "3".

For example, if the risk level corresponding to the testing scenario is "R1", the probability level is "P2" and the complexity level is "C3", the scenario weight of the testing scenario may be "6".

At step S104, a test period corresponding to the scenario weight is determined, and the test period is used for the autonomous driving system being tested in the testing scenario.

At this step, the test period corresponding to the scenario weight obtained at step S103 is determined, and the determined test period is used for testing the autonomous driving system in the testing scenario. The larger the scenario weight is, the longer the corresponding test period is, for example, the testing scenario is tested for each version of the autonomous driving system; the smaller the scenario weight is, the shorter the corresponding test period is, for example, the testing scenario is tested only for a released version of the autonomous driving system.

It may be appreciated that a method for determining the test period for the testing scenario according to the present disclosure may be a function of the autonomous driving system, i.e., the autonomous driving system determines the test period for the testing scenario, and then the autonomous driving system is tested in the testing scenario. For another example, the method for determining the test period of the testing scenario according to the present disclosure may be an individual function implementation, i.e., after the test period of the testing scenario is determined, the test period is sent to the autonomous driving system so that the autonomous driving system tests in the testing scenario according to the test period.

In addition, after the autonomous driving system is tested in the testing scenario according to the determined test period, the step may further include: obtaining problems occurring in the autonomous driving system being tested in the testing scenario; determining a degree of importance of the problems according to the scenario weights corresponding to the testing scenarios, where the larger the scenario weight corresponding to the testing scenario is, the higher the degree of importance of the problem occurring in the testing scenario is. Hence, this step may further provide a developer with clearer problem-solving priority levels according to the scenario weights corresponding to the testing scenarios, thereby improving the developing efficiency.

In addition, after completing the test of the testing scenarios, the autonomous driving system may offer driving scores for the testing scenarios. Since the testing scenarios are difficult or easy, it is unreasonable and inaccurate to directly take an average value of the driving scores as an evaluation of the autonomous driving system.

Hence, to evaluate the driving capability of the autonomous driving system more reasonably and accurately, after the autonomous driving system is tested in the testing scenarios according to the determined test period, this step may further include: obtaining respectively, driving scores for the autonomous driving system being tested in a plurality of testing scenarios; performing weighted averaging for the driving scores according to the scenario weights corresponding respectively to the plurality of testing scenarios, and taking a calculation result as a final score of the autonomous driving system. Hence, this step may amplify the effect of the driving scores of important scenarios through the scenario weights, and reduce the effect of the driving scores of unimportant scenarios, thereby more accurately evaluating the driving capability of the autonomous driving system.

For example, if the driving score obtained by the autonomous driving system being tested in testing scenario 1 is 90, the driving score obtained by being tested in testing scenario 2 is 80, the scenario weight of the testing scenario 1 is 1, and the scenario weight of the testing scenario 2 is 4, then a final score of the autonomous driving system obtained at this step will be $(90\times1+80\times4)/(4+1)=82$.

Hence, it is possible in the present disclosure to, by obtaining the scenario weights of the testing scenarios, distinguish degrees of importance of different testing scenarios, increase testing times for important testing scenarios, reduce testing times for unimportant testing scenarios and improve the testing efficiency of the autonomous driving system on the one hand, and on the other hand, further improve the testing quality of the autonomous driving system based on the scenario weights and the testing results.

Figure 2:
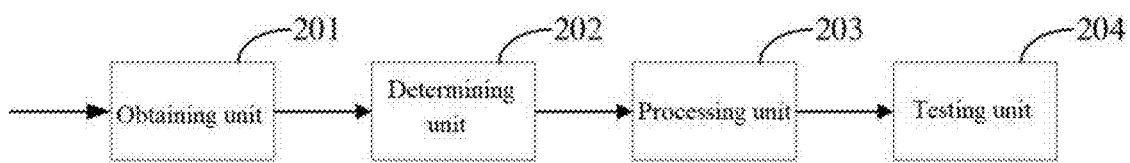
FIG. 2 illustrates a block diagram of an apparatus for testing an autonomous driving system according to an embodiment of the present disclosure.

FIG. 2 illustrates a block diagram of an apparatus for testing an autonomous driving system according to an embodiment of the present disclosure. With reference to FIG. 2, the apparatus includes: an obtaining unit 201, a determining unit 202, a processing unit 203 and a testing unit 204.

The obtaining unit 201 is configured to obtain scenario description information of a testing scenario.

The obtaining unit 201 is configured to obtain the scenario description information of the testing scenario. For example, the testing scenario in the obtaining unit 201 may be a combination of a driving occasion and a driving situation for testing the driving performance of the autonomous driving system. For example, the scenario description information obtained by the obtaining unit 201 may include information describing external states such as roads, traffic facilities, weather conditions and traffic participants corresponding to the testing scenario, and a driving mission and state of the autonomous driving system.

It may be appreciated that the autonomous driving system in the present disclosure is a system enabling autonomous driving, and may be an actual automatically-driven vehicle or a virtual autonomous driving software.

The determining unit 202 is configured to analyze the scenario description information, and determine a scenario risk, a scenario probability and a scenario complexity corresponding to the testing scenario.

The determining unit 202 analyzes the scenario description information obtained by the obtaining unit 201, and determines the scenario risk, the scenario probability and the scenario complexity corresponding to the testing scenario.

Specifically, the scenario risk corresponding to the testing scenario determined by the determining unit 202 is used to represent the autonomous driving system has no collision risk in the testing scenario, or has a collision risk including a vehicle collision risk and a pedestrian collision risk. The vehicle collision risk includes a collision between vehicles and a collision between a vehicle and a traffic facility; the pedestrian collision risk includes a collision between a vehicle and a pedestrian, a collision between a vehicle and a rider (a bicyclist or a motorcyclist), and a collision between a vehicle and a motorcycle.

The scenario probability corresponding to the testing scenario determined by the determining unit 202 is used to represent a frequency of occurrence of the testing scenario in actual driving, and includes a low probability (occurs a few times or less a year), a medium probability (occurs once a month or more often averagely) and a high probability (occurs during almost every drive averagely).

The scenario complexity corresponding to the testing scenario determined by the determining unit 202 includes an environment complexity and a mission complexity corresponding to the testing scenario. The environment complexity represents an environment attribute corresponding to the testing scenario, and includes a road type (e.g., a straight road, a crossroad, a slope, a tunnel, a mountain path etc.) where the testing scenario lies, a number of obstacles (e.g., the number of obstacles is greater than 3, or less than or equal to 3), weather conditions (e.g., fine, rainy, snowy and foggy), light conditions (e.g., daylight, dark, and dark but lighted), road surface conditions (e.g., good, wet, snowy, and icy), humidity conditions (e.g., high, normal, and low), temperature conditions (e.g., high, normal, and low) and atmospheric pressure conditions (e.g., high, normal, and low); the mission complexity represents a mission category of the mission(or task) performed by the autonomous driving system in the testing scenario, and the mission category for example includes "longitudinal control" and "longitudinal control and lateral control".

In addition, upon analyzing the scenario description information, the determining unit 202 may obtain the scenario risk, scenario probability and the scenario complexity included in the scenario description information by a conventional natural language understanding; the determining unit 202 may also obtain them by using a pre-trained machine learning model, i.e., input the scenario description information into the machine learning model, and obtain the scenario risk, the scenario probability and the scenario complexity corresponding to the testing scenario according to an output result of the machine learning model.

The processing unit 203 is configured to obtain a scenario weight of the testing scenario according to the scenario risk, scenario probability and scenario complexity.

The processing unit 203 obtains a scenario weight of the testing scenario according to the scenario risk, the scenario probability and the scenario complexity obtained by the obtaining unit 202.

Specifically, the processing unit 203 may employ the following manner upon obtaining the scenario weight of the testing scenario according to the scenario risk, the scenario probability and the scenario complexity: determining a risk level according to the scenario risk, determining a probability level according to the scenario probability, and determining a complexity level according to the scenario complexity; and obtaining the scenario weight of the testing scenario, according to a summing result of weight values corresponding to the determined risk level, probability level and complexity level.

The processing unit 203 may take the summing result of weight values corresponding to the three levels as the scenario weight of the testing scenario; or may take a numerical value corresponding to a scope where the summing result lies as the scenario weight of the testing scenario, after obtaining the summing result of weight values corresponding to the three levels.

Upon determining the risk level according to the scenario risk, the processing unit 203 takes a level corresponding to the determined scenario risk as the risk level according to a preset correspondence relationship between the risk and the level. In the preset correspondence relationship between the risk and the level, "no collision risk" corresponds to the level "R1", "vehicle collision risk" corresponds to level "R2", and "pedestrian collision risk" corresponds to level "R3".

Upon determining the probability level according to the scenario probability, the processing unit 203 may take a level corresponding to the determined scenario probability as the probability level according to a preset correspondence relationship between the probability and the level. In the preset correspondence relationship between the probability and the level, "a low probability" corresponds to level "P1", "a medium probability" corresponds to level "P2", and "a high probability" corresponds to level "P3".

The scenario complexity includes many attributes. Hence, to enhance the accuracy of the obtained complexity level, the processing unit 203 may employ the following manner upon determining the complexity level according to the scenario complexity: obtaining a standard complexity corresponding to a standard scenario, the standard complexity including a standard environment attribute and a standard mission attribute, the standard environment attribute being "a straight road, the number of obstacles less than or equal to 3, fine(such as sunny), daylight, good road surface conditions", and the standard mission attribute being "longitudinal control"; comparing the scenario complexity with the standard complexity to determine differed(or changed) attributes, and obtaining level up values corresponding to respective differed attributes; determining the complexity level according to a summing result between the obtained level up values and an initial level. The initial level corresponds to the standard scenario, and the initial level is 0.

It may be appreciated that the level up values corresponding to the differed attributes in the processing unit 203 are preset, where the level up value when the attribute "road type" changes is "1", the level up value when the attribute "the number of obstacles" changes is "1", the level up level when the attribute "weather conditions" changes is "2", the level up value when the attribute "light conditions" changes is "2", the level up value when the attribute "road surface conditions" changes is "2", and the level up value when the mission attribute changes is "1", It may be appreciated that upon determining the complexity level according to the summing result between the level up value and the initial level, the processing unit 203 may take the level corresponding to the summing result as the complexity level.

Upon obtaining the weight values corresponding to the levels, the processing unit 203 may respectively obtain the weight values corresponding to risk level, probability level and complexity level according to the preset correspondence relationship between the levels and weight values.

The preset correspondence relationship between the levels and weight values in the processing unit 203 may be: the weight value corresponding to the risk level "R1" is "1", : the weight value corresponding to the risk level "R2" is "2", and the weight value corresponding to the risk level "R3" is "3"; the weight value corresponding to the probability level "P1" is "1", the weight value corresponding to the probability level "P2" is "2", and the weight value corresponding to the probability level "P3" is "3"; the weight value corresponding to the complexity level "C1" is "1", the weight value corresponding to the complexity level "C2" is "2", and the weight value corresponding to the complexity level "C3" is "3".

The testing unit 204 is configured to determine a test period corresponding to the scenario weight, the test period being used for the autonomous driving system being tested in the testing scenario.

The testing unit 204 determines the test period corresponding to the scenario weight obtained by the processing unit 203, the determined test period being used for the autonomous driving system being tested in the testing scenario. The larger the scenario weight is, the longer the corresponding test period is; the smaller the scenario weight is, the shorter the corresponding test period is.

In addition, after the autonomous driving system is tested in the testing scenario according to the determined test period, the testing unit 204 may further include: obtaining problems occurring in the autonomous driving system being tested in the testing scenario; determining a degree of importance of the problems according to the scenario weights corresponding to the testing scenarios, where the larger the scenario weight corresponding to the testing scenario is, the higher the degree of importance of the problem occurring in the testing scenario is. Hence, the testing unit 204 may further provide a developer with clearer problem-solving priority levels according to the scenario weights corresponding to the testing scenarios, thereby improving the developing efficiency.

In addition, after completing the test of the testing scenarios, the autonomous driving system may offer driving scores for the testing scenarios. Since the testing scenarios are difficult or easy, it is unreasonable and inaccurate to directly take an average value of the driving scores as an evaluation of the autonomous driving system.

Hence, to evaluate the driving capability of the autonomous driving system more reasonably and accurately, after the autonomous driving system is tested the testing scenarios according to the determined test period, the testing unit 204 may further include: obtaining respectively driving scores for the autonomous driving system being tested in a plurality of testing scenarios; performing weighted averaging for the driving scores according to the scenario weights corresponding respectively to the plurality of testing scenarios, and taking a calculation result as a final score of the autonomous driving system. Hence, the testing unit 204 may amplify the effect of the driving scores of important scenarios through the scenario weights, and reduce the effect of the driving scores of unimportant scenarios, thereby more accurately evaluating the driving capability of the autonomous driving system.

In an embodiment of the present disclosure, an electronic device is proposed. The electronic device includes at least one processor, and a storage communicatively connected with the at least one processor. The storage stores instructions executable by the at least one processor, and the instructions are executed by the at least one processor to enable the at least one processor to perform the method for testing an autonomous driving system as disclosed in various embodiment described above.

In an embodiment of the present disclosure, it is disclosed a non-transitory computer-readable storage medium storing computer instructions therein, where the computer instructions are used to cause the computer to perform the method for testing an autonomous driving system as disclosed in various embodiments described above.

Figure 3:
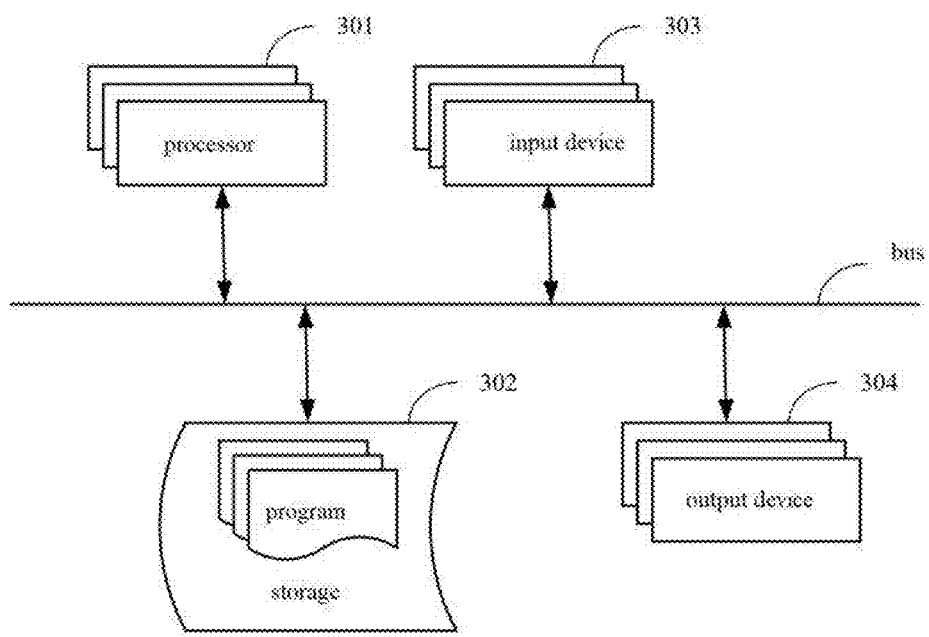
FIG. 3 illustrates a block diagram of an electronic device for implementing a method for testing the autonomous driving system according to an embodiment of the present disclosure.

With reference to FIG. 3, it shows a block diagram of an electronic device for implementing the method for testing an autonomous driving system according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 3, the electronic device includes: one or more processors 301, a storage 302, and interfaces connected to components and including a high-speed interface and a low speed interface. Each of the components are interconnected using various busses, and may be mounted on a common motherboard or in other manners as appropriate. The processor may process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 301 is taken as an example in FIG. 3.

The storage 302 is a non-transitory computer-readable storage medium provided by the present disclosure. Where, the storage stores instructions executable by at least one processor, so that the at least one processor executes method for testing an autonomous driving system according to the present disclosure. The non-transitory computer-readable storage medium of the present disclosure stores computer instructions, which are used to cause a computer to execute the method for testing an autonomous driving system according to the present disclosure.

The storage 302 is a non-transitory computer-readable storage medium and may be used to store non-transitory software programs, non-transitory computer executable programs and modules, such as program instructions/modules (e.g., the obtaining unit 201, the determining unit 202, the processing unit 203 and the testing unit 204 as shown in FIG. 2) corresponding to the method for testing an autonomous driving system according to the present disclosure. The processor 301 executes various functional applications and data processing of the server, i.e., implements the method for testing an autonomous driving system in the above method embodiments, by running the non-transitory software programs, instructions and modules stored in the storage 302.

The storage 302 may include a storage program region and a storage data region, where the storage program region may store an operating system and an application program needed by at least one function; the storage data region may store data created according to the use of the electronic device for testing the autonomous driving system. In addition, the storage 302 may include a high-speed random access memory, and may also include a non-transitory memory, such as at least one magnetic disk storage device, a flash memory device, or other non-transitory solid-state storage device. In some embodiments, the storage 302 may optionally include a storage remotely arranged relative to the processor 301, and these remote memories may be connected to the electronic device for testing the autonomous driving system through a network. Examples of the above network include, but are not limited to, the Internet, an intranet, a local area network, a mobile communication network, and combinations thereof.

The electronic device for implementing the method for testing the autonomous driving system may further include an input device 303 and an output device 304. The processor 301, the storage 302, the input device 303 and the output device 304 may be connected through a bus or in other manners. In FIG. 3, the connection through the bus is taken as an example.

The input device 303 may receive inputted numeric or character information and generate key signal inputs related to user settings and function control of the electronic device for testing the autonomous driving system, and may be an input device such as a touch screen, keypad, mouse, trackpad, touchpad, pointing stick, one or more mouse buttons, trackball and joystick. The output device 304 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The technical solutions according to embodiments of the present disclosure solves the technical problem in the existing art that test should be performed for tens of thousands of scenarios since it is unable to distinguish testing scenarios with different degrees of importance, thereby achieving the technical effect of reducing the testing pressure of the autonomous driving system and improving the testing efficiency of the autonomous driving system.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure may be achieved, which is not limited herein.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for testing an autonomous driving system, comprising:

obtaining scenario description information of a testing scenario;

analyzing the scenario description information, and determining a scenario risk, a scenario probability and a scenario complexity corresponding to the testing scenario;

obtaining a scenario weight of the testing scenario according to the scenario risk, the scenario probability and the scenario complexity; and determining a number of testing times corresponding to the scenario weight, wherein the autonomous driving system is to be tested in the testing scenario for the number of testing times, and wherein the number of testing time increases as the scenario weights increases, wherein obtaining the scenario weight of the testing scenario according to the scenario risk, the scenario probability and the scenario complexity comprises:

determining a risk level according to the scenario risk, determining a probability level according to the scenario probability, and determining a complexity level according to the scenario complexity; and obtaining the scenario weight of the testing scenario, according to a summing result of weight values corresponding respectively to the risk level, the probability level and the complexity level.

2. The method according to claim 1, wherein the scenario complexity includes an environment complexity and a mission complexity corresponding to the testing scenario.

3. The method according to claim 1, wherein determining the complexity level according to the scenario complexity comprises:
   obtaining a standard complexity corresponding to a standard scenario;
   comparing the scenario complexity with the standard complexity to determine differed attributes, and obtaining level up values corresponding respectively to the differed attributes; and
   determining the complexity level according to a summing result between the obtained level up values and an initial level.

4. The method according to claim 1, further comprising:
   obtaining problems occurring in the autonomous driving system being tested in the testing scenario; and
   determining a degree of importance of the problems occurring in the autonomous driving system, according to the scenario weight corresponding to the testing scenario.

5. The method according to claim 1, further comprising:
   obtaining, respectively, driving scores for the autonomous driving system being tested in a plurality of testing scenarios; and
   performing weighted averaging for the driving scores according to the scenario weights corresponding respectively to the plurality of testing scenarios, and taking a calculation result as a final score of the autonomous driving system.

6. An electronic device, comprising:
   at least one processor; and
   a storage communicatively connected with the at least one processor; wherein,
   the storage stores instructions executable by the at least one processor, and the instructions are executed by the at least one processor to enable the at least one processor to perform a method for testing an autonomous driving system, wherein the method comprises:
   obtaining scenario description information of a testing scenario;
   analyzing the scenario description information, and determining a scenario risk, a scenario probability and a scenario complexity corresponding to the testing scenario;
   obtaining a scenario weight of the testing scenario according to the scenario risk, the scenario probability and the scenario complexity; and
   determining a number of testing times corresponding to the scenario weight, wherein the autonomous driving system is to be tested in the testing scenario for the number of testing times, and wherein the number of testing time increases as the scenario weights increases,
   wherein obtaining the scenario weight of the testing scenario according to the scenario risk, the scenario probability and the scenario complexity comprises:
   determining a risk level according to the scenario risk, determining a probability level according to the scenario probability, and determining a complexity level according to the scenario complexity; and
   obtaining the scenario weight of the testing scenario, according to a summing result of weight values corresponding respectively to the risk level, the probability level and the complexity level.

7. The electronic device according to claim 6, wherein the scenario complexity includes an environment complexity and a mission complexity corresponding to the testing scenario.

8. The electronic device according to claim 6, wherein determining the complexity level according to the scenario complexity comprises:
   obtaining a standard complexity corresponding to a standard scenario;
   comparing the scenario complexity with the standard complexity to determine differed attributes, and obtaining level up values corresponding respectively to the differed attributes; and
   determining the complexity level according to a summing result between the obtained level up values and an initial level.

9. The electronic device according to claim 6, wherein the method further comprises:
   obtaining problems occurring in the autonomous driving system being tested in the testing scenario; and
   determining a degree of importance of the problems occurring in the autonomous driving system, according to the scenario weight corresponding to the testing scenario.

10. The electronic device according to claim 6, wherein the method further comprises:
    obtaining, respectively, driving scores for the autonomous driving system being tested in a plurality of testing scenarios; and
    performing weighted averaging for the driving scores according to the scenario weights corresponding respectively to the plurality of testing scenarios, and taking a calculation result as a final score of the autonomous driving system.

11. A non-transitory computer-readable storage medium storing computer instructions therein, wherein the computer instructions are used to cause the computer to perform a method for testing an autonomous driving system, wherein the method comprises:
    obtaining scenario description information of a testing scenario;
    analyzing the scenario description information, and determining a scenario risk, a scenario probability and a scenario complexity corresponding to the testing scenario;
    obtaining a scenario weight of the testing scenario according to the scenario risk, the scenario probability and the scenario complexity; and
    determining a number of testing times corresponding to the scenario weight, wherein the autonomous driving system is to be tested in the testing scenario for the number of testing times, and wherein the number of testing time increases as the scenario weights increases,
    wherein obtaining the scenario weight of the testing scenario according to the scenario risk, the scenario probability and the scenario complexity comprises:
    determining a risk level according to the scenario risk, determining a probability level according to the scenario probability, and determining a complexity level according to the scenario complexity; and
    obtaining the scenario weight of the testing scenario, according to a summing result of weight values corresponding respectively to the risk level, the probability level and the complexity level.

12. The non-transitory computer-readable storage medium according to claim 11, wherein the scenario complexity includes an environment complexity and a mission complexity corresponding to the testing scenario.

13. The non-transitory computer-readable storage medium according to claim 11, wherein determining the complexity level according to the scenario complexity comprises:
    obtaining a standard complexity corresponding to a standard scenario;
    comparing the scenario complexity with the standard complexity to determine differed attributes, and obtaining level up values corresponding respectively to the differed attributes; and
    determining the complexity level according to a summing result between the obtained level up values and an initial level.

14. The non-transitory computer-readable storage medium according to claim 11, wherein the method further comprises:
    obtaining problems occurring in the autonomous driving system being tested in the testing scenario; and
    determining a degree of importance of the problems occurring in the autonomous driving system, according to the scenario weight corresponding to the testing scenario.

15. The non-transitory computer-readable storage medium according to claim 11, wherein the method further comprises:
    obtaining, respectively, driving scores for the autonomous driving system being tested in a plurality of testing scenarios; and
    performing weighted averaging for the driving scores according to the scenario weights corresponding respectively to the plurality of testing scenarios, and taking a calculation result as a final score of the autonomous driving system.

* * * * *